United States Patent
Guevin et al.

(10) Patent No.: US 12,086,642 B2
(45) Date of Patent: Sep. 10, 2024

(54) CONTEXT AWARE DISTRIBUTION OF COMPUTING

(71) Applicant: ADTRAN, Inc., Huntsville, AL (US)

(72) Inventors: Thomas F. Guevin, Nashua, NH (US); Dennis Cox, Huntsville, AL (US); Sjohn Chambers, Madison, AL (US)

(73) Assignee: ADTRAN, Inc., Huntsville, AL (US)

(*) Notice: Subject to any disclaimer, the term of this patent is extended or adjusted under 35 U.S.C. 154(b) by 456 days.

(21) Appl. No.: 17/468,749

(22) Filed: Sep. 8, 2021

(65) Prior Publication Data

US 2022/0083387 A1   Mar. 17, 2022

Related U.S. Application Data

(60) Provisional application No. 63/078,243, filed on Sep. 14, 2020.

(51) Int. Cl.
*G06F 9/50* (2006.01)
*G06F 9/48* (2006.01)
*G06F 9/54* (2006.01)
*G06N 5/01* (2023.01)

(52) U.S. Cl.
CPC ......... *G06F 9/5038* (2013.01); *G06F 9/4881* (2013.01); *G06F 9/547* (2013.01); *G06N 5/01* (2023.01)

(58) Field of Classification Search
None
See application file for complete search history.

(56) References Cited

U.S. PATENT DOCUMENTS

| | | | |
|---|---|---|---|
| 10,719,367 B1* | 7/2020 | Kim | G06F 9/5005 |
| 2005/0009466 A1* | 1/2005 | Kamdar | H04H 20/40 |
| | | | 455/3.02 |
| 2013/0205028 A1 | 8/2013 | Crockett et al. | |
| 2017/0302713 A1* | 10/2017 | Littlejohn | H04L 67/60 |
| 2018/0329733 A1 | 11/2018 | Aronov et al. | |

(Continued)

OTHER PUBLICATIONS

Extended European Search Report in European Appln No. 21193651.3, dated Feb. 2, 2022, 10 pages.

(Continued)

*Primary Examiner* — Craig C Dorais
(74) *Attorney, Agent, or Firm* — Fish & Richardson P.C.

(57) ABSTRACT

Methods and systems for context-aware distributed computing. In one aspect, a system includes a work administrator system; an API; a worker module; and a work administrator. One or more worker modules register with one or more work administrators. The worker modules may inform the work administrators of their processing capabilities and capacity. The work administration system receives a request for processing via the API. A work administrator parses a request into one or more discrete work requests and publishes each work request to the worker modules. The worker modules notify the work administrator whether they can perform the work, along with load and capabilities. The work administrator a worker module to perform each work request. When a worker module completes the work, it notifies the work administrator. The work administration system may aggregate the results from one or more worker modules and provide a response via the API.

18 Claims, 3 Drawing Sheets

(56) References Cited

U.S. PATENT DOCUMENTS

2020/0285523 A1    9/2020   Guim et al.
2021/0142224 A1*   5/2021   McCourt ................ G06N 20/20

OTHER PUBLICATIONS

Kumar et al., "CASH: Context Aware Scheduler for Hadoop," Advances in Computing, Communications and Informatics, Aug. 3, 2012, 52-61.

Zhang et al., "CASH: A Context-Aware Scheduling for Hypervisor Based on KSM," 2013 IEEE 10th International Conference on High Performance Computing and Communications & 2013 IEEE International Conference on Embedded and Ubiquitous Computing, Nov. 13, 2013, 1866-1871.

* cited by examiner

CONTEXT AWARE DISTRIBUTION OF COMPUTING

CROSS-REFERENCE TO RELATED APPLICATIONS

This application claims priority to U.S. Application Ser. No. 63/078,243, filed on Sep. 14, 2020, which is incorporated by reference in its entirety.

BACKGROUND

Existing approaches to distribution of computing request such as Request/Response, Publish/Subscribe, and Map/Reduce are insufficient in modern, heterogeneous, modularized distributed systems. Request/Response requires homogenous clients to talk to a server, all statically mapped. This mechanism ensures a response is sent by a server to the client but alone fails to allocate computing tasks efficiently. A fanout method can send requests (via round-robin or other load balancing mechanism) to multiple servers but is static in nature and cannot account for pluggable, modularized systems. Publish/Subscribe allows heterogeneous clients to gather information from a server but it does not ensure a service receives the data nor does it ensure that a service performs work, as all subscribing clients may ignore a processing request. Publish/Subscribe cannot be used to effectively broker processing, because the processing may not occur, or may it be processed by multiple clients. Map/Reduce and other distributed computing algorithms have some similarities but are more static than dynamic.

SUMMARY

This specification relates to context aware distribution of computing. Processing distribution and management can occur in a number of different ways, for example, based on fanout or round-robin approaches. For example, requests can be sent to multiple workers via these approaches. Over time, customizable modules and hardware may be added to the system resulting in a heterogeneous system with heterogeneous work processing. Additionally, performance requirements affect processing distribution and management.

In general, one innovative aspect of the subject matter described in this specification can be embodied in a method for context-aware distribution of computing in loosely coupled, heterogeneous, or pluggable systems. Worker modules register with the system; required processing is published as a work request; worker modules notify the system whether they can perform the work; the system chooses one or more worker modules to perform the work; the system responds to each worker module notification; worker modules complete the work and provide the result to the system.

The worker modules register with the system via an API. The worker modules register with the system when they become available to perform work. The worker modules also unregister with the system via an API when they become unavailable. Through registration, the system understands the availability of potential workers to perform required processing. The worker modules may also provide information about the type of processing work they are capable of performing via the API.

The system may use a publish/subscribe mechanism to notify workers of new required processing via a work request. The work request provides details about the required processing, and information about how worker modules can request to perform the work request and provide results or error status.

When worker modules receive notification of work requests, worker modules can use a request/response mechanism to notify the system whether they can perform the work. The worker modules may also provide their current processing load and processing capability or capacity.

The system chooses one or more worker modules to perform the work request and responds to each worker module's request with an indication of whether that worker should perform the work. The system may determine whether each worker module is capable of performing the work request when assigning the work request to one or more worker modules.

As the system processes work requests and assigns the work requests to worker modules, it is possible for two or more worker modules to diverge based on their computational loads. The system may use heuristics to determine which worker module can do the work fastest or at least cost. The system may use heuristics such as depth (e.g., the number of work requests currently being processed by each worker module), velocity (e.g., average processing time for a similar work request by each worker module), computational resources (e.g., the computing power of each worker module or the computing capabilities of each worker module), or latency (e.g., communication or computing throughput of worker modules when communicating with remote worker modules). The heuristics are configurable based on these and other information about the worker modules that are available to the system.

When a worker module completes the work request, it may use a standard request/response mechanism to provide the result to the system. The result may be merged with other worker modules' results, and an overall result is provided by the API.

When a worker has an error or is unable to finish the work, the worker module can notify the system. The system can then republish the work so that one or more other worker modules may attempt the work request.

The invention, therefore, provides an algorithmic process to distribute work requests to a series of heterogeneous services in a fair and collaborative manner, aggregate the results, and handle errors.

These and other embodiments can each optionally include parsing work requests into discrete pieces of work to be performed by multiple worker modules to successfully accomplish the requested processing. The parsed or discrete requests can be thought of as individual work requests. After all the requested processing is complete, the system aggregates the results of the discrete pieces of work and provides a result or status to the requestor for the work request.

A system may have multiple services that handle incoming work requests and perform the processing required to assign those work request to worker modules, aggregate the results, and handle errors.

Work requests may involve processing and worker modules for which the required processing is known or unknown. For instance, the system may know that worker modules provide specific processing capabilities with specific throughput. Alternatively, the system may receive work for which the processing is unknown. The required processing may be unknown at load time or otherwise, because it could depend on third party services or worker modules, software licenses, or scalable computing power. The required processing may also be unknown because it varies based on deep details of the request and other items like time and date.

In general, another aspect of the subject matter described in this specification can be embodied in systems that include a database, a file server, or a web server hosting a web site. Requested processing may become higher-level and more complex in certain applications (e.g., a website home page, data warehousing and visibility applications, device management suites, customer service interfaces). Such requests may result in creation of high-level work requests corresponding to data retrieval, data manipulation, content rendering, content display, hardware upgrades, hardware diagnostics, hardware profiles, and the like. These high-level work requests may be parsed into discrete work requests for completion by the worker modules. The discrete work requests may then be aggregated, and the results provided for display or further processing to these applications.

In some implementations, parsing the request for processing into a work request may involve determining a work request type, comparing the work request type to known work request types, splitting the work request into one or more child requests, or storing child work requests. For instance, a work administrator may categorize the work request type based an indicator contained within the work request. Alternatively, a work administrator may determine a work request type of a work request by comparing the work request to work requests with known work request types. In yet another implementation, the work administrator may compare a work request type to known work request types. In one implementation, the request for processing may require processing by multiple systems or may encompass multiples steps. In these and other instances, a work administrator may parse the request for processing into one or more work requests which may then be parsed again into child work requests. The work requests and child work requests may be stored in: memory, persistent storage, enqueued for processing, archived, etc. The work requests and child work requests may be stored with hierarchy and order maintained.

In some implementations, the response to the work request from the worker module may include one or more of: an operational state of the worker module, an indication of whether the worker module is capable of performing the work request, heuristics associated with the work request, or heuristics associated with the worker module. For instance, a worker module responding to a work request may provide information about its operational state, health, processing capacity, capabilities, current load, enqueued work requests, error counts or codes, and the like. A worker module responding to a work request may also provide information specific to that work request, including an indicator of whether the worker module is capable of performing the work request, capability with respect to a portion of the work request, and the like. In one implementation the worker module may provide heuristics associated with the work request or similar work requests when responding to the work request. Such heuristics may include, expected processing time, error counts, error rates, QoS information, and other heuristics as described herein. In one implementation the worker module may provide heuristics associated with the worker module. These heuristics may include throughput, latency, velocity, error count, error rate, load, work request queue size, QoS information, and other heuristics as described herein.

Particular embodiments of the subject matter described in this specification can be implemented so as to realize one or more of the following advantages. The method for context-aware distribution of computing has the advantage of optimizing back-end work in a modular system where computation modules are loadable, heterogeneous, or customizable. The method also has advantages for assigning work that has varying computational costs, including avoiding worker module overload and balancing computationally expensive work requests across worker modules. The method also has the benefit of assigning work based on the capability and run-time reality of each worker module.

The techniques described in this document improve assignment and completion of backend work requests by ensuring that customizable pieces of a modular, heterogeneous system perform work according to their availability and capability, even when those customizable pieces may change over time. The techniques described in this document also reduce processing latency, increase velocity, prevent worker module starvation, and reduce the processing burden on any given worker module. The techniques described in this document also enable a system to effectively manage work requests necessary for high-level tasks required of the system in a real-time or near-real-time environment. In this manner, the techniques described in this document enable completion of tasks that would be impossible to complete individually or serially under conventional deployments.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Methods and systems for context-aware distributed computing are discussed throughout this document. As will be discussed in more detail with reference to the figures, a work administration system provides one or more APIs for making requests for processing.

For example, an application sends a request for processing to an API of the work administration system. In one implementation, a work administrator of the work administration system receives the request for processing from the API and parses the request for processing into one or more discrete work requests. In one implementation, the work administrator then publishes each work request to worker modules of the work administration system. In one implementation, the worker modules determine if they have the functionality necessary to perform the work request and then respond to the work administrator. In one implementation, the response may contain information including whether the worker module has the functionality necessary to perform the work request, the current load of the worker module, available computing resources, estimated time to complete the work request, and diagnostic status of the worker module. In one implementation, the work administrator then determines, based on the information received from the worker modules in response to publication of the work request, which worker module should perform the work request. In one implementation, the work administrator then responds individually to each worker module that responded to publication of the work request with an indication of whether they have been selected to perform the work request. In one implementation, the worker module performs the work request and provides the result to the work administrator that in turn provides the result to the application via the API.

As such, applications have a common work administration system that abstracts the intricacies of the many systems, modules, services, hardware, software, virtual machines, and the like that may exist in a modularized, heterogeneous, decentralized, or distributed computing environment. By way of non-limiting example only, applications may be online portals, e-commerce platforms, device management systems, customer service portals, customer support applications, network management systems, cybersecurity platforms, data analysis tools, data visualization applications, and the like. For example, a graphical user interface may need to pull data from various sources and systems in a service workflow. As another example, device management may encompass upgrades across multiple device categories during the same workflow. As another example, deploying a complex network service may encompass provisioning several network elements that have different configurations and capabilities. In these instances, the workflows require subdivision and allocation and may have large computational and time costs. Allocation of the subdivided work may need to account for computation and time costs and dependencies. The application may encapsulate the work administration system described herein or the work administration system may be external or loosely coupled to the application, such as through an API.

The techniques discussed in this document are described with reference to distributed, heterogeneous processing systems comprised of pluggable, modular services, comprising both hardware and software, or a combination thereof, with varied functionality, capabilities, and processing capacity. The techniques discussed in this document can also be used to distribute computing processing in other technological environments. Examples include, but are not limited to, scientific computing (DNA analysis, Epidemiology, Population Growth, etc.), graphical computing (Image Analysis, Rendering, Creation, etc.) and Online Gaming (Pairing Algorithms, Back Pressure and Computer Opponents).

As used throughout this document, a work administration system refers to a middleware or broker platform sitting in between applications and the computing and data resources they rely upon. Example work administration systems include off-the-shelf or custom hardware and appliances. It only requires a message broker system that supports both publish-subscribe and request-response messaging mechanisms. A work administration system comprises one or more APIs, one or more work administrators, and one or more worker modules.

Worker modules may be software services, software applications, software processes, execution threads, virtual machines, or the like. Worker modules may also be hardware modules, processors, groups of processors, systems on a chip, or the like. Worker modules may also be a combination of hardware and software. Worker modules may be pluggable or static in that they may be loadable on runtime. Worker modules may be redundant, such as in a high-availability system or a load-balanced system. Worker modules may be always-on such as in a mission-critical system.

Work administrators may be software services, software applications, software processes, execution threads, virtual machines, or the like. Work administrators may also be hardware modules, processors, groups of processors, systems on a chip, or the like. Work administrators may also be a combination of hardware and software. There may be one or more work administrators in a work administration system. Software, hardware, or a combination of software and hardware may function in a hierarchy as a single work administrator.

Multiple work administrators may form a hierarchy whereby a parent work administrator has one or more child work administrators. One example implementation of a work administrator hierarchy would be a tree of work administrators and worker modules. Work administrators operating in a hierarchy may parse work requests and assign them to workers or parse work requests and assign them to child work administrators for further parsing and assignment to worker modules. As can be appreciated, in a hierarchy of work administrators and worker modules, a work administrator node may have children that are work administrators, worker modules, or both. For instance, where multiple virtual machines, software services, or data repositories exist in the system a parent work administrator may exist in a hierarchy with child work administrators managing work request for each virtual machine, software service, or data repository.

Multiple work administrators may also exist in a pool. As one example, work administrators may collaborate such that one or more work administrators claim a request for processing coming to the work administration system via the API. Such an implementation may occur in high availability or mission critical deployments or in systems with redundant or similar virtual machines, software services, or data repositories, as an example.

Multiple work administrators may also exist in a combined hierarchy/pool architecture. As one example, a parent work administrator may pass work requests to the pool of child work administrators. One or more work administrators in the pool of child work administrators may then claim the work request or a portion of the work request according to the invention disclosed herein for processing of the work request by worker modules associated with the one or more child work administrators.

A work administrator may also comprise one or more worker modules. For example, a virtual machine, software service, or data repository may contain both work administrators and worker modules.

Worker modules in the work administration system register with work administrators in the work administration system. Work administrators also register with the work administration system. Registration may occur at system boot or may occur during run time such that work administrators and worker modules may register and unregister as they are available. In this way, the work administration system may be aware of the work administrators and worker modules and each work administrator may be aware of worker modules available to it. For example, worker modules may register when they become available to perform work and unregister when they become unavailable. This registration provides the work administration system with how many potential worker modules are available. The registration process may not provide enough information for the work administration system or work administrators to know whether a worker module can perform a work request.

In one implementation, when worker modules become available they register with the work administration system via an API. In one implementation, as a worker module becomes unavailable, it deregisters with the work system via an API. In one implementation, during registration, the worker modules may also provide the work administration system with details about available computing resources, available capabilities and functionalities, and the like. In one implementation, as worker modules change their availability (e.g., coming online or going offline, booting up or down, idle, power-saving, sleep, inactive, active, etc.) or their available computing resources, capabilities and functionalities, they update their registration with the work administration system via an API. In such an implementation, the work administration system and the work administrators learn of the worker modules available to perform work and details about available computing resources, available capabilities and functionalities, and the like. In such an implementation, the work administration system maintains this information and can use it to optimize determinations regarding work request assignments. However, such an implementation is not required.

In one implementation, worker module registration may occur where each worker module registers with the work administrator(s) in advance. The work administrators know the worker modules and can optimize the publishing of work requests accordingly (e.g., on a per node, per cluster, per capability basis). For relatively static systems with stable worker modules, this may be a more efficient approach.

In another implementation, worker module registration may occur where each worker module registers with a proxy, and the work administrator(s) communicate with the proxy. The work administrators do not have visibility of the worker modules and broadcast the work requests through the proxy such that any of the worker modules is a candidate for assignment of each work request. For ephemeral workers (short lived), this may be a more efficient approach.

Figure 1:
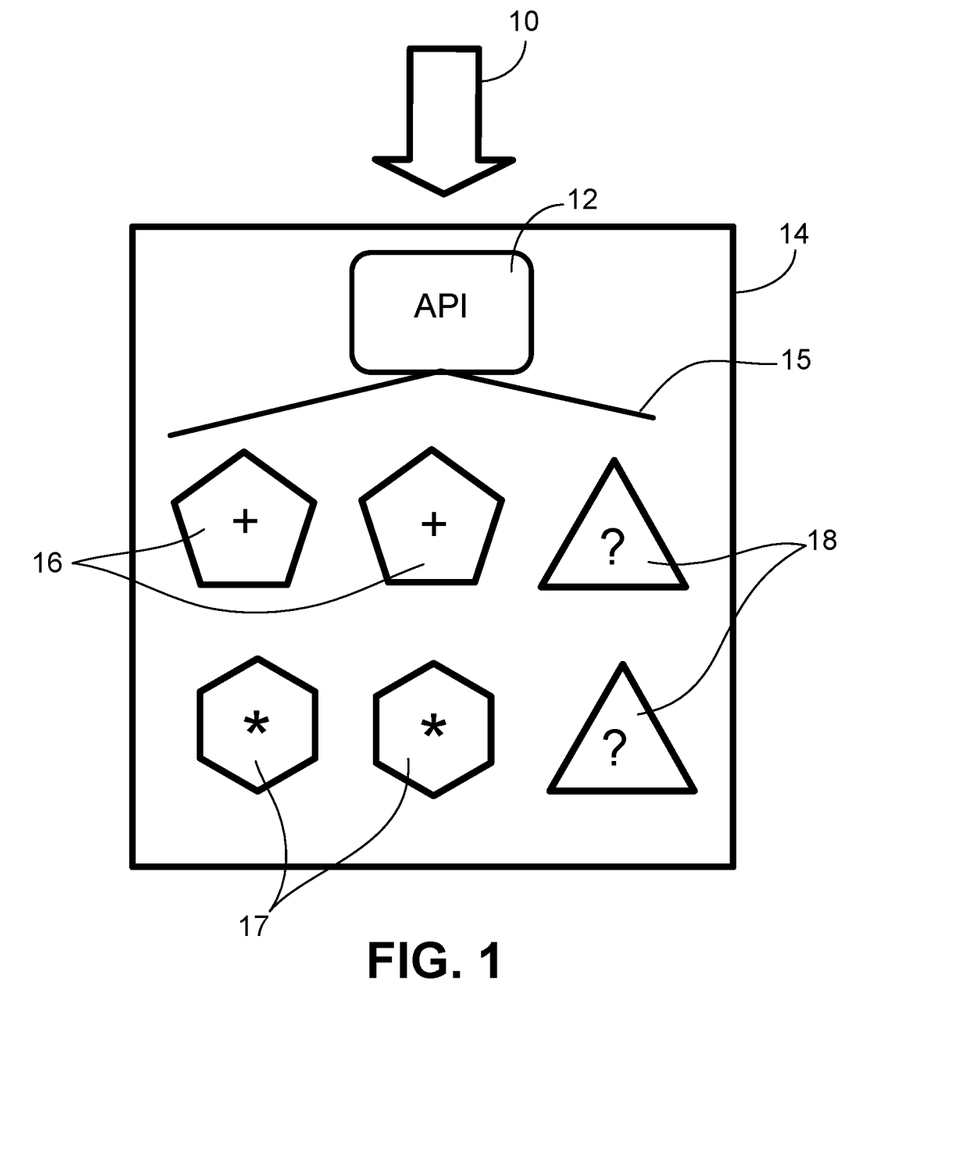
FIG. 1 is an example of a request entering a system via an API.

FIG. 1 shows an example request for processing 10 entering the work administration system 14 via an API 12. The work administration system 14 comprises one or more work administrators 15 and one or more worker modules 16, 17, 18.

In the example of FIG. 1, the work administration system 14 is a simple calculator, which supports addition and multiplication (and possibly other operations based on customizable add-ons). The pentagon shapes represent two worker modules 16 that are capable of addition, the hexagon shapes represent two worker modules 17 that are capable of multiplication, and the triangle shapes represent two worker modules 18 with functionality and capabilities unknown to the work administrator 15. The functionality of these worker modules 18 is unknown, because it could depend on third party services, software licenses, or computing power; it could also vary based on deep details of the request for processing, and other items like time and date.

In the example of FIG. 1, a request for processing 10 is received at the API 12. The request for processing 10 in this example requires three arithmetic operations, [(1+2), (3*4), (5−6)]. In this example, the work administration system 14 brokers the request for processing 10 to a work administrator 15. In the alternative, the work administration system 14 may provide the request for processing 10 to a work administrator 15 that then parses the processing request and brokers the discrete work requests to work administrators or worker modules, as described herein. In this example, the work administrator 15 parses the request for processing 10 into three discrete work requests: (1+2), (3*4), (5−6). In an embodiment, due to the registration process, the work administrator 15 knows that it has six worker modules 16, 17, 18: two worker modules 16 have the addition capability; two worker modules 17 have the multiplication capability; and two worker modules 18 have unknown capabilities. The work administrator 15 sends work request (1+2) to the two worker modules 16 with the addition capability and to the two worker modules 18 with unknown capability. The work administrator sends work request (3*4) to the two worker modules 17 that support multiplication and to the two worker modules 18 with unknown capability. The work administrator 15 sends work request (5−6) to the two worker modules 18 with unknown capability. Alternatively, the work administrator 15 may publish each work request to all worker modules 16, 17, 18. Each worker module 16, 17, 18 responds to the publication of each work request. A worker module's 16, 17, 18 response to publication of a work request includes: whether the worker module can perform the work, data about the worker module's current load, and data about the worker module's capabilities.

In one embodiment, the work administrator waits to collect responses to the publication request from each of the worker modules. The work administrator may implement a timeout mechanism when waiting for the responses from worker modules. In this way, the work administrator can identify unresponsive worker modules. The work administrator may notify the work administration system of unresponsive worker modules. The work administration system may attempt to bring nonresponsive worker modules back online. Once the work administrator collects responses to a work request from the worker modules, the work administrator determines which worker module or worker modules should perform the work. This determination may be made based on a number of configurable factors, including quickest to finish, most available computing resources, fewest work requests in queue, or other factors as can be appreciated by one of skill in the art. Once the work administrator determines which worker module or worker modules should perform the work request it assigns the work request to that worker module or worker modules. If one of the discrete work requests cannot be performed by the worker modules, then the work administration system notifies the requestor via the API. In the example, if the (5−6) work request cannot be performed by the two worker modules 18 with unknown capabilities, the work administration system would notify the application via the API 12 that this portion of the request for processing 10 cannot be completed.

In one embodiment, a worker module that is assigned a work request processes the work request or enqueues the work request to its processing queue for later processing. In an embodiment, the work administrator may provide quality of service (QoS) requirements when publishing the work request to worker modules. The worker modules receiving a publication notice of a work request with QoS requirements determine whether they can perform the work request within the QoS requirements associated with the work request. The work administrator then determines the worker module to assign the work request based upon worker module capability and QoS requirements. When a worker module is assigned a work request with QoS requirements, the worker module determines how to satisfy the QoS requirements of the work request in consideration of the other work requests it may have. A worker module may interrupt processing of the current work request to process a QoS work request, enqueue the QoS work request to a priority queue, or otherwise prioritize the QoS work request in its processing queue.

In an embodiment, the work administrator may also prioritize a request for processing with associated QoS requirements received from the API. The work administrator may prioritize requests for processing with QoS requirements.

As the worker modules perform work requests, it is possible that one or more worker modules may diverge from their baseline capabilities, functionalities, processing capacity, or otherwise based on load, availability, or for other reasons. A worker module may recognize this divergence and notify the work administrator or work administration system of divergence heuristics. Notification may occur passively, such as part of a response to publication of a work request, or actively, such as through an API to the work administration system. The work administrator or work administration system may update the information maintained about the worker modules in the work administration system in response to such a notification.

The information monitored by each worker module or maintained by the work administration system could include heuristics for use in determining work request assignments by work administrators. These heuristics could include: number of requests currently being processed (to give a view of depth); average time to process (to give a view of velocity); computing power (another view of velocity, but could be specific to horizontal nodes); or latency (for remote services or ones that must communicate externally). Other heuristics may include an error count for each worker module or a computational cost of processing the same, similar, or related work requests. Still other heuristics may be calculated from heuristics. For example, latency may be the product of computational cost and average time to process. Other heuristics include but are not limited to similar measurements over a time-span (e.g. last 30 seconds), similar measurements for different categories of work (e.g. all work, work similar to this request, etc.), errors encountered while processing previous work, successful and unsuccessful work requests processed.

In one implementation, a work administrator (P) publishes a work request (X). Two worker modules ($W_1$ and $W_2$) respond to the publication of the work request, X. The information from $W_1$ and $W_2$ provided in the response indicates 0 work requests being processed, an average time to process the work request of 0, and average cost to process the work request of 0. As can be appreciated, the 0 responses indicate that $W_1$ and $W_2$ have not encountered a similar work request previously, have recently come online, or otherwise lack heuristic information about the work request. P randomly picks between $W_1$ because both $W_1$ and $W_2$ provided the same information in response to publication of the work request. $W_1$ starts work request, X. Before $W_1$ finishes, P publishes a second work request (Y). $W_2$ responds to Y with a 0 response and $W_1$ responds that it is processing X. P picks $W_2$ because it is not currently processing a request. $W_2$ starts work request Y. $W_1$ and $W_2$ finish X and Y and store statistics related to processing those work requests. For example, $W_1$ stores (time=2, cost=3) and $W_2$ stores (time=1, cost=3). P publishes work request (Z). $W_1$ and $W_2$ respond with their respective stored statistics and also each indicate they have 0 requests in queue. P assigns Z to $W_2$ as it is faster and the computational cost is the same. Assuming an example where instead the stored statistics are different such that $W_1$ (time=2, cost=3) and $W_2$ (time=1, cost=7). With these statistics, P would apply a heuristic of the product of processing time and computational cost with $W_1$ (heuristic=6) and $W_2$ (heuristic=7) and assign work request Z to $W_1$.

Figure 2:
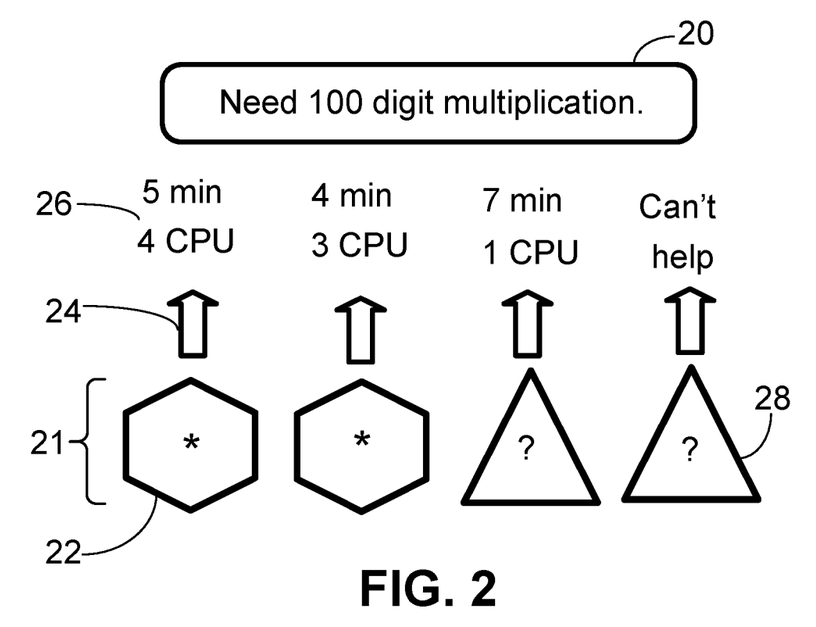
FIG. 2 shows worker modules responding to an example work request.

FIG. 2 shows an example of four worker modules 21 responding to a work request 20. Each worker module 21 provides information 26 such as processing load and capability in the response 24. The work administrator uses information 26 provided by worker modules 21 in their response 24 to determine one or more worker modules that can perform the work request 20 fastest and at the least computational cost. As can be appreciated, the information 26 provided by a worker modules 21 in response to a work request 20 is configurable and may vary by the worker module 21. For example, when a work administrator publishes a work request 20, worker modules 21 may use a request/response mechanism to notify 24 the work administrator whether the worker module 21 can perform the work request 20, along with current processing load on the worker module and its capabilities. The work administrator knows that two worker modules 22 have the required capability and it is unknown whether the other two worker modules 28 have the required capability.

When publishing a discrete work request, a work administrator may broadcast each discrete work request to all of its worker modules. In a further embodiment, the work administrator may selectively broadcast each discrete work request to those worker modules with the corresponding capability. The work administrator may also selectively broadcast each discrete work request to those worker modules with unknown capabilities. In this way, selective broadcasting can decrease control message overhead in the system.

In response to the work request 20, the worker modules 21 in FIG. 2 provide information and heuristics 26. The information and heuristics 26 include an indication 24 of whether each worker module 21 can perform the work request 20. One worker module 28 indicates that it cannot process the work request. The other three worker modules indicate they can process the work request 20 and provide information and heuristics 26 including estimated time to process the work request 20 and available computing resources with which to process the work request 20.

Figure 3:
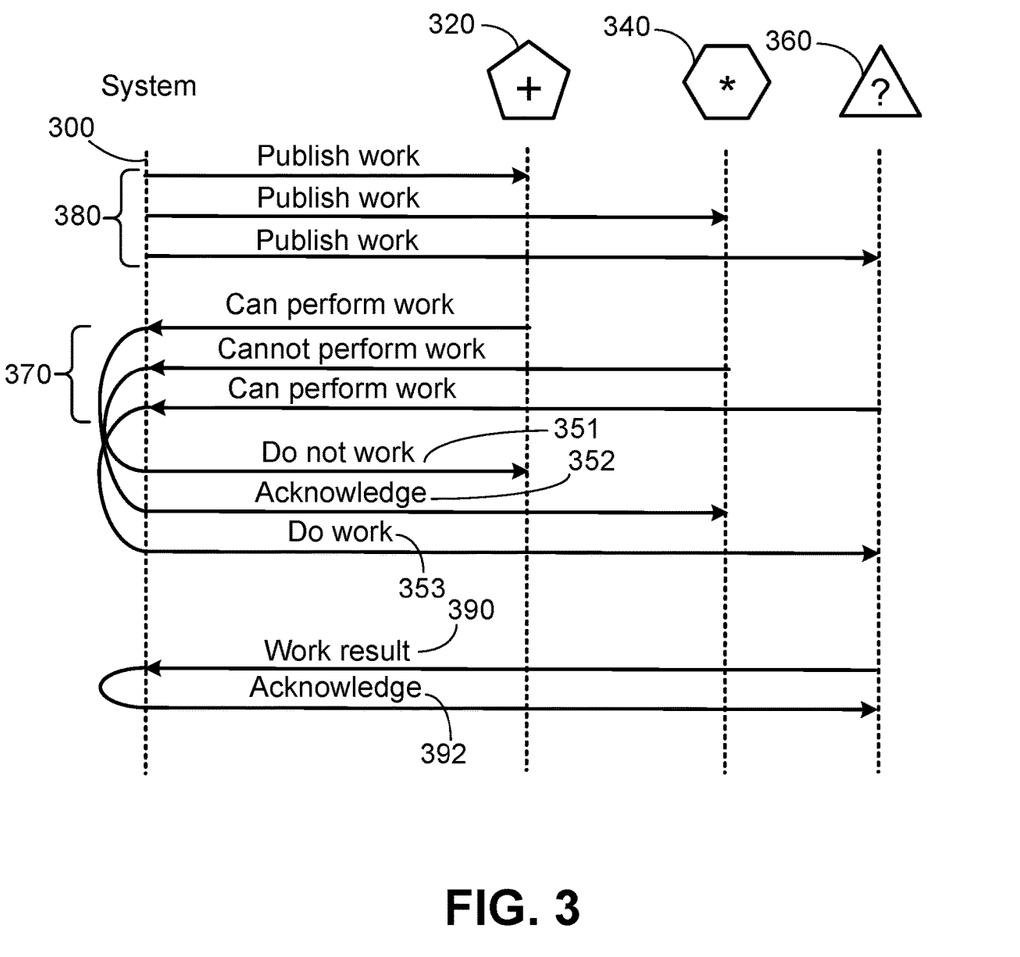
FIG. 3 is a flow chart of an example process involving work request publication, worker module response to the work request, and a worker module notifying the system of completion of the work request.

FIG. 3 is a flow chart of an example process whereby a work request is sent by the work administrator 300, worker modules 320, 340, 360 respond to the notification of the work request, the work administrator 300 assigns the work request, the assigned worker module 360 completes the work request and provides the result 390 to the work administrator 300.

In one embodiment, the work administrator 300 uses a publish/subscribe mechanism to notify worker modules 320, 340, 360 of a work request. The "publish work" message 380 provides details about the work request, information about how worker modules 320, 340, 360 can request to perform the work request, and how the worker modules 320, 340, 360 can provide results of processing the work request. In the example of FIG. 3, the work administrator 300 broadcasts a "publish work" message 380 to three worker modules 320, 340, 360. As can be appreciated, the specific implementation and format of the "publish work" message 380 is configurable and implementation specific. One worker module 320 is capable of addition. One worker module 340 is capable of multiplication. One worker module 360 has unknown capabilities and functionality with respect to the demands of the work request. For instance, the work administrator 300 may know certain functionality and capability of the worker module 360, but does not know if it has the specific functionality and capability required to perform the work request.

In one embodiment, worker modules 320, 340, 360 notified of the work request through a "publish work" message 380 use a request/response mechanism to request 370 to perform the work to the work administrator. The request 370 indicates whether the worker modules 320, 340, 360 can perform the work, along with their current load and capability. The work administrator 300 chooses one or more worker modules 320, 340, 360 to perform the work request, as described herein. The work administrator 300 responds to each worker module's request 370 with an indication of whether that worker module should perform the work request. This response may include an "acknowledge" message 352, a "do work" message 353, or a "do not work" message 351. As can be appreciated, the specific implementation and format of the "acknowledge" message 352, "do work" message 353, or "do not work" message 351 is configurable and implementation specific.

In one embodiment, when a worker module 360 completes a work request assignment, the worker module 360 uses a request/response mechanism to provide the work request result 390 to the work administrator 300. The work administrator 300 may send an "acknowledge" message 392 to the worker module to acknowledge receipt of the work request result. As can be appreciated, the specific implementation and format of the "acknowledge" message 392 is configurable and implementation specific. The result may be merged or aggregated with other worker module's results, and an overall result for the processing request from the application is provided by the API.

When a worker module experiences an error in processing the work request, it may notify the work administrator of the error. When a work administrator assigns a work request to a worker module, it may associate a time for completion with that work request based upon information known about the work request, the worker module assigned to complete the work request, and other heuristics. If a worker module does not provide the work request result or error notification to the work administrator within the time for completion, the work administrator may query the worker module for its status or the status of it processing of the work request. If a worker module does not provide the work request result or error notification to the work administrator within the time for completion, the work administrator may either ask the worker to retry the work, or attempt to assign the work request to another worker module. In the event that work administrator determines that the work request cannot be completed due to errors in processing, the error result for the processing request may be provided to the application via the API. The error result may be merged or aggregated with other worker module's results, and an overall result, including any errors, for the processing request from the application is provided by the API. The work administrator may track error counts for each worker module. Likewise, the worker modules may track their own error counts. The error counts may be considered as a heuristic in determining assignments of work requests. For instance, a work request may be assigned as between two otherwise equivalent worker modules to the worker module with the lower error count.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of context-aware distribution of computing, comprising:
receiving, by an application programming interface (API) of a work administration system, a request for processing;
parsing the request for processing into a work request;
publishing the work request to a worker module, wherein publishing the work request to the worker module comprises selectively broadcasting the work request to the worker module based on a capability of the worker module;
receiving a response to the work request from the worker module;
assigning the worker module to perform the work request;
receiving a result of the work request; and
providing, by the API, the result of the request for processing.

2. The method of claim 1 wherein parsing the request for processing into a work request comprises one or more of:
determining a work request type,
comparing a work request type to known work request types,
splitting the work request into one or more child work requests, or
storing work requests.

3. The method of claim 1 wherein the response to the work request from the worker module comprises one or more of:
an operational state of the worker module,
an indication of whether the worker module is capable of performing the work request,
heuristics associated with the work request, or
heuristics associated with the worker module.

4. The method of claim 1 wherein assigning the worker module to perform the work request comprises a determination based on a heuristic.

5. The method of claim 1 wherein providing, by the API, the result of the request for processing comprises aggregating the results of a plurality of work requests.

6. The method of claim 1 wherein receiving the result of the work request comprises receiving a work request result or an error notification.

7. A system comprising:
a work administrator system;
an application programming interface (API) in communication with the work administration system;
a worker module; and
a work administrator in communication with the API and the worker module, wherein the work administrator operates to manage a request for processing by performing operations including:
receiving a request for processing from the API;
parsing the request for processing into a work request;
publishing the work request to the worker module, wherein publishing the work request to the worker module comprises selectively broadcasting the work request to the worker module based on a capability of the worker module;
receiving a response to the work request from the worker module;
assigning the worker module to perform the work request;
receiving a result of the work request; and
providing the result of the request for processing to the API.

8. The system of claim 7 wherein parsing the request for processing into a work request comprises one or more of:
determining a work request type,
comparing a work request type to known work request types,
splitting the work request into one or more child work requests, or
storing work requests.

9. The system of claim 7 wherein the response to the work request from the worker module comprises one or more of:
an operational state of the worker module,
an indication of whether the worker module is capable of performing the work request,
heuristics associated with the work request, or
heuristics associated with the worker module.

10. The system of claim 7 wherein assigning the worker module to perform the work request comprises a determination based on a heuristic.

11. The system of claim 7 wherein providing, by the API, the result of the request for processing comprises aggregating the results of a plurality of work requests.

12. The system of claim 7 wherein receiving the result of the work request comprises receiving a work request result or an error notification.

13. The system of claim 12 wherein, in response to the error notification, the work administrator requests the worker module to retry the work request.

14. The system of claim 12 wherein, in response to the error notification, the work administrator attempts to assign the work request to a second worker module.

15. A non-transitory, computer-readable medium storing one or more instructions executable by a computer system to perform operations comprising:
receiving, by an application programming interface (API) of a work administration system, a request for processing;
parsing the request for processing into a work request;
publishing the work request to a worker module, wherein publishing the work request to the worker module comprises selectively broadcasting the work request to the worker module based on a capability of the worker module;
receiving a response to the work request from the worker module;
assigning the worker module to perform the work request;
receiving a result of the work request; and
providing, by the API, the result of the request for processing.

16. The non-transitory, computer-readable medium of claim 15 wherein parsing the request for processing into a work request comprises one or more of:
determining a work request type,
comparing a work request type to known work request types,
splitting the work request into one or more child work requests, or
storing work requests.

17. The non-transitory, computer-readable medium of claim 15 wherein the response to the work request from the worker module comprises one or more of:
an operational state of the worker module,
an indication of whether the worker module is capable of performing the work request,
heuristics associated with the work request, or
heuristics associated with the worker module.

18. The non-transitory, computer-readable medium of claim 15 wherein assigning the worker module to perform the work request comprises a determination based on a heuristic.

* * * * *